United States Patent [19]

Larratt et al.

[11] Patent Number: 5,193,764
[45] Date of Patent: Mar. 16, 1993

[54] AIRCRAFT ARRESTING SYSTEM

[75] Inventors: Dennis R. Larratt, Littleton, Colo.; James F. Garrity, New Berlin; Thomas A. Dundas, Cudahy, both of Wis.; Jeffrey T. Kates, Littleton, Colo.

[73] Assignee: Manville Corporation, Denver, Colo.

[21] Appl. No.: 769,899

[22] Filed: Oct. 1, 1991

[51] Int. Cl.⁵ .......................................... B64C 25/68
[52] U.S. Cl. ........................... 244/110 R; 244/110 A; 244/114 R; 188/377
[58] Field of Search .......... 244/110 R, 110 A, 110 H, 244/111, 114 R; 188/377, 371

[56] References Cited

U.S. PATENT DOCUMENTS 3,066,896 12/1962 Schirtzinger .................. 244/114 R
3,967,704 7/1976 Ogden ............................. 244/110 R Primary Examiner—Joseph F. Peters, Jr.
Assistant Examiner—Christopher P. Ellis
Attorney, Agent, or Firm—Cornelius P. Quinn

[57] ABSTRACT

A system for arresting movement of an aircraft traveling off the end of a runway at high speeds. Rigid, friable, fire resistant foam boards, preferably phenolic foam, are connected to form a panel, and a plurality of layers comprised of stacked panels are adhered to a base surface. The panels are formed from unfaced foam boards, the compressive strength of the stack of boards being less than the force exerted by the landing gear of the aircraft to allow the boards to be crushed by the landing gear.

13 Claims, 3 Drawing Sheets

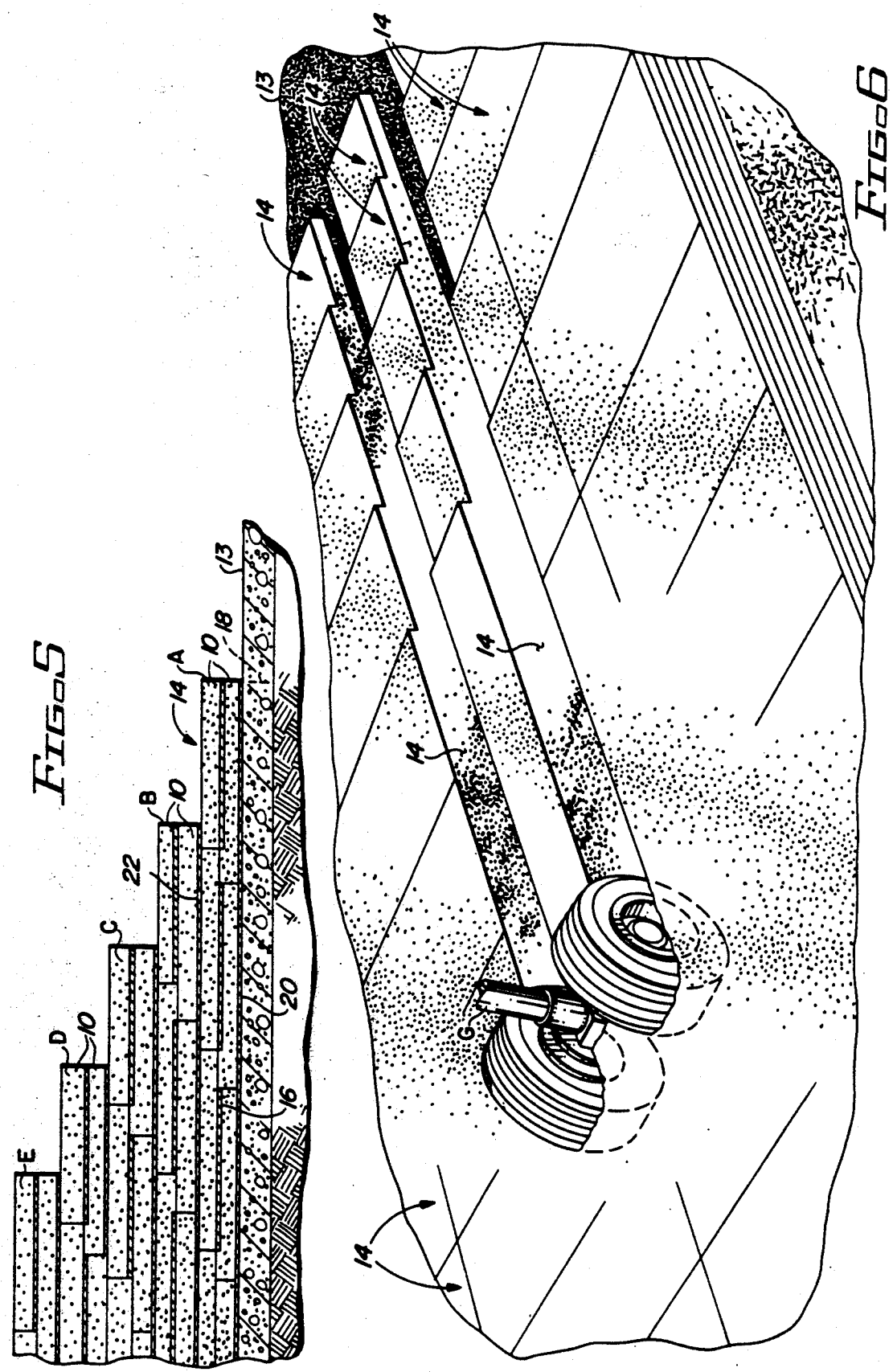

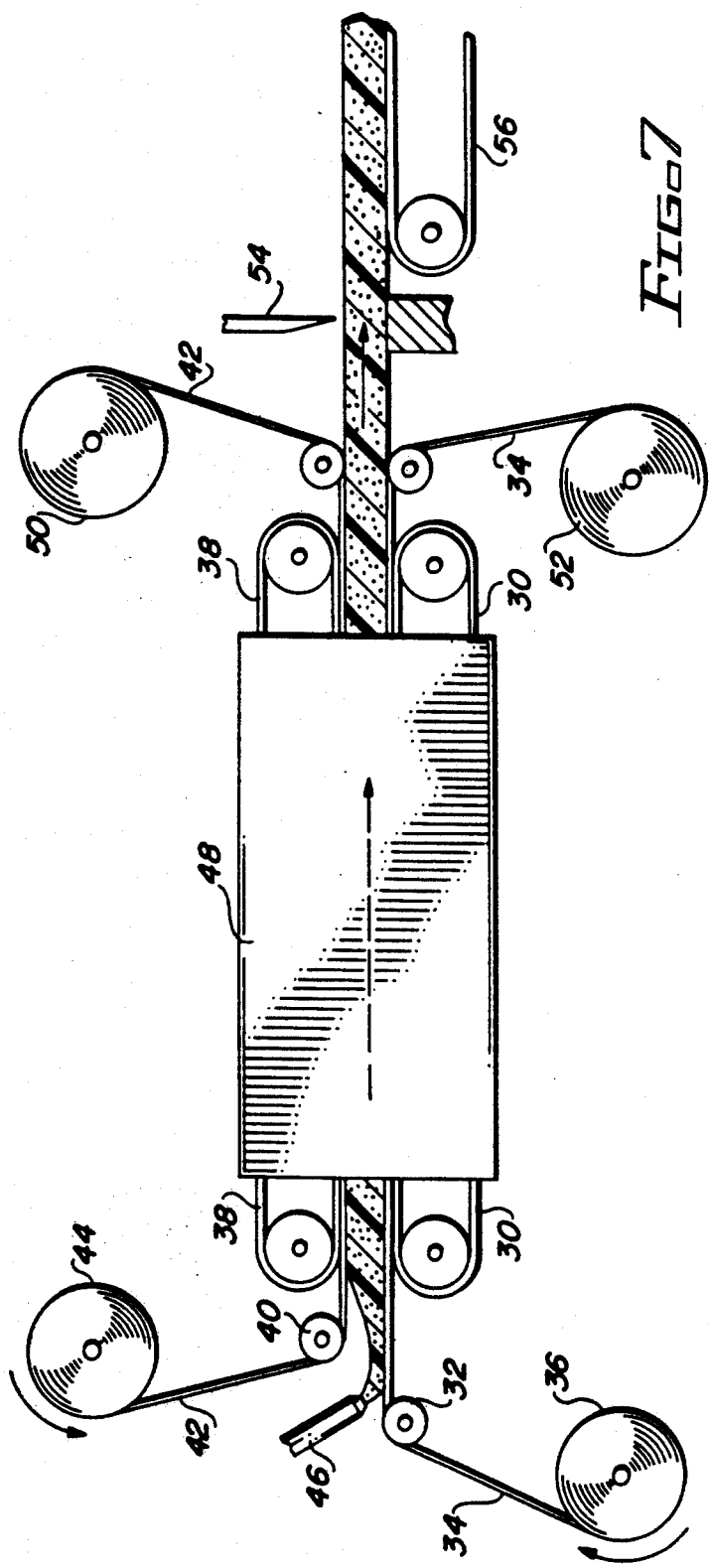
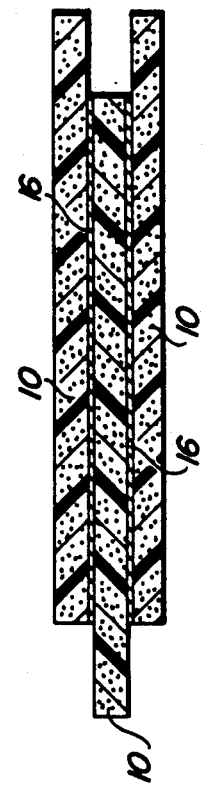
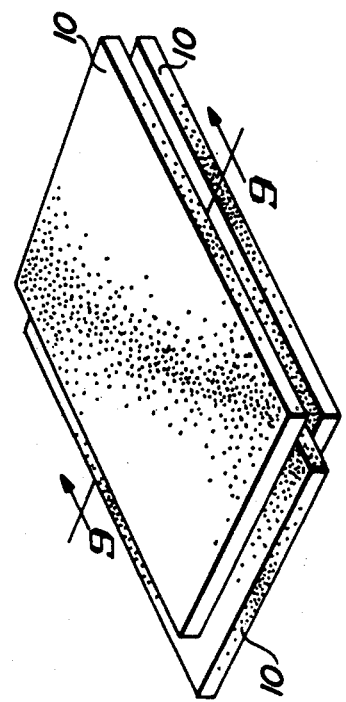

AIRCRAFT ARRESTING SYSTEM

FIELD OF THE INVENTION

This invention relates to a method and means for reducing personal injuries and aircraft damage when an aircraft overruns an airport runway. More particularly, it relates to a system for slowing and stopping an aircraft within a reduced distance after it leaves the runway.

BACKGROUND OF THE INVENTION

At times, airplanes experience problems as they travel along the runway prior to takeoff. Such problems may include engine failure, tire blowout or any unexpected situation or occurrence that could affect the ability of the aircraft to become airborne and fly safely. When this occurs before the aircraft reaches the speed at which it can no longer stop before reaching the end of the runway, the takeoff is aborted and all available means are employed to bring the aircraft to a halt. If the problem occurs at this critical speed or at greater speeds, the takeoff is normally continued unless the problem is so severe that the aircraft would be incapable of flight.

If the decision to reject the takeoff is made too late or at speeds that are too high, the normal braking system of the aircraft will be unable to stop it before reaching the end of the runway. When an aircraft leaves the runway at high speeds there is a good chance that it will be damaged as a result of bouncing over rough terrain or impacting an obstacle. If the damage is severe, such as the rupturing of fuel tanks or the collapse of sections of fuselage, the results can be cataclysmic, destroying the aircraft and injuring or killing the passengers and crew. If the aircraft enters a body of water after leaving the runway, damage is still likely depending on the depth of the water and the type of bed, with the threat of drowning always being present. These dangers are of course also present when an aircraft overruns the runway during landing.

Experience has shown that the braking system of an aircraft involved in a rejected takeoff, or the braking system of an aircraft involved in an overrun landing where the reverse thruster is not functioning, cannot be relied on to stop the aircraft within a safe distance after the aircraft has left the runway and is traveling over a hard or icy surface. An aircraft is more likely to be safely stopped if the ground is soft due to the drag created by the frame and landing gear plowing through the ground. This has led to the suggestion of a soft-ground arrestor system. A problem with this concept, however, is that the material beyond the runway is usually soil, which can be quite unpredictable in its arresting capability as moisture and temperature conditions change. For example, dry clay can be hard and difficult to penetrate, making it likely that aircraft will simply ride over the surface without adequate slowing. Wet clay, on the other hand, can cause an aircraft to become quickly mired. This can cause collapse of the landing gear and can increase the chances of personal injury and damage to the aircraft. In cold climates, the moisture in clay can freeze, making the clay useless as an arrestor. At temperatures above freezing clay dries out quickly, requiring water to be added and worked into the material to maintain the desired strength.

Sand should be relatively dry to be an effective arrestor and would require a system for protecting it from rain. This could be done by providing the sand in waterproof bags, but these could be easily ruptured and the freezing of rain or snow filling the gaps between bags would make the sand less effective than required.

Shallow water ponds have also been suggested as being possible arrestors. They would, however, be ineffective in cold climates where they might freeze, and they would hinder the access of emergency vehicles and hamper efforts to evacuate passengers. Further, ponds create stagnation problems and attract wildlife that could interfere with aircraft operations.

The use of gravel beds has also been considered inasmuch as gravel does not suffer to the same degree as clay or sand from weather changes A major problem with this material, however, is the danger to aircraft engines from gravel sprayed up by the landing gear. Also, planing of the nose gear and the main landing gear wheels tends to occur at higher speeds, preventing the landing gear from sufficiently penetrating the bed.

A successful arrestor bed should not itself be the cause of landing gear collapse. By maintaining the landing gear intact the chances of structural damage to the aircraft are lessened, thereby reducing the possibility of fuel tank rupture. The arrestor bed should be capable of being quickly repaired after an overrun incident so as to be rendered operational as soon as possible. It should be capable of functioning properly in all weather extremes and should not require excessive maintenance.

As an alternative to the above materials, it has also been proposed that a foam arrestor bed be applied in aircraft safety overrun areas. While the use of foam appeared to have certain advantages over soil and water, no practical way of implementing the idea has heretofore been available.

It is an object of this invention to provide a layer of foam material in an aircraft safety overrun area which efficiently and safely slows an aircraft while minimizing the chance of personal injury or damage to the aircraft. Another object is to provide an aircraft arresting layer of foam material which is economical to produce and easy to set in place and maintain.

SUMMARY OF THE INVENTION

In accordance with the invention, an aircraft arresting area is provided adjacent an end of a runway so that airplanes unable to stop by the end of the runway will move into the area. The aircraft arresting area is formed by adhering a plurality of stacked layers of rigid, friable fire resistant foam to each other, with the lowermost layer of foam being adhered to a support surface. The stacked layers are designed so that the compressive resistance of the combined layers of rigid foam is less than the force exerted by the landing gear of an aircraft of the type intended to be arrested when moving into the arresting area from the runway, so that the foam is crushed when contacted by the aircraft. The preferred method of accomplishing this is to form the layers from a plurality of unfaced rigid foam boards which are friable in nature and fire resistant. This eliminates facing material from the construction, thereby precluding facings from strengthening the board to the point where the aircraft rides up onto the upper surface of the arresting area.

Preferably, the unfaced rigid foam boards in one layer are adhered to the unfaced rigid foam boards in the next adjacent layer by adhesive, and are secured to adjacent boards in the same layer by a mechanical edge interlock.

The rigid foam employed in the invention preferably is of closed cell structure, having a density in the range of 2 pounds per cubic foot (pcf) to 4 pcf and having a compressive strength in the range of 20 pounds per square inch (psi) to 80 psi. The preferred material is phenolic foam and the adhesive is compatible, such as a latex adhesive. The size of the arresting area should be sufficient to allow aircraft traveling at high rejected takeoff speed to come to a halt within the area.

BRIEF DESCRIPTION OF THE DRAWINGS

FIG. 5 is an enlarged partial sectional view of the end portion of the aircraft arrestor bed of the invention;

FIG. 6 is a pictorial representation, shown partially in section, of a portion of the arrestor bed of the invention as it would appear with the landing gear of an aircraft moving through it;

FIG. 7 is a schematic view of a process for producing foam boards for use in the invention;

FIG. 8 is a pictorial representation of a modified form of panel; and

FIG. 9 is a transverse sectional view taken on line 9—9 of FIG. 8.

DETAILED DESCRIPTION OF THE PREFERRED EMBODIMENT

To provide a successful practical foam aircraft arresting bed it is necessary for the foam to possess energy absorbing properties, to be fire resistant and to be held in place so that it will stay substantially intact as the aircraft enters the bed.

Looking at the energy absorbing requirement, the combination of foam thickness and the character of the foam itself must be able to create sufficient drag on the aircraft landing gear to stop the aircraft within a prescribed distance. As part of this requirement, the foam should be of a friable nature and should have a compressive strength low enough to permit rolling aircraft to crush it, but not so high as to permit the aircraft to ride up over the surface of the foam. Crushing of the foam results in ruts, the walls of which scrape the sides of the landing gear to further aid in slowing the aircraft. If the foam were resilient instead of crushing when contacted by aircraft landing gear, it would not absorb sufficient energy to create the necessary drag. Thus the foam should fail catastrophically under aircraft loads.

Figure 1:
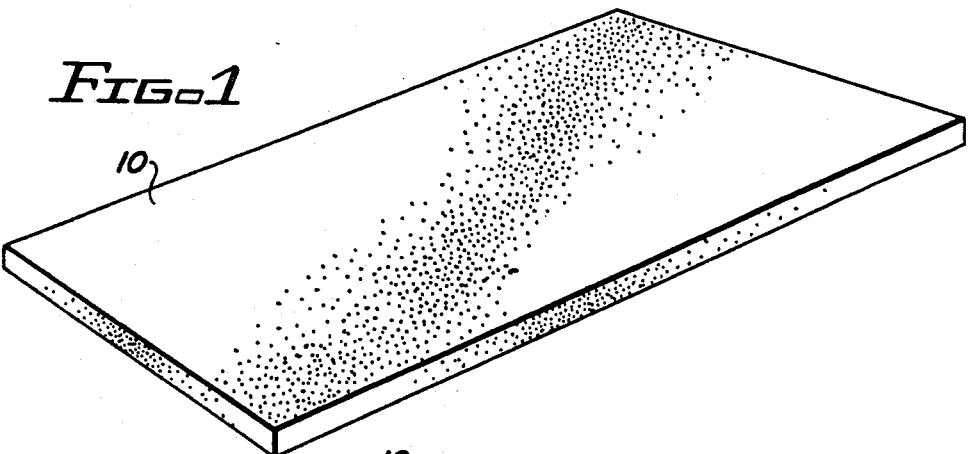
FIG. 1 is a pictorial representation of a foam board utilized in the invention.

These criteria are met by the foam arrestor of the invention which is made up of individual units comprised of foam boards of the type shown in FIG. 1. The foam board 10 is an unfaced board of closed cell composition. Foam boards of the type suitable for use in the invention may vary in thickness, normally being within the broad range of 1 to 6 inches and preferably within the range of 2 to 4 inches. They should further possess a compressive strength in the range of 20 to 80 psi, with the preferred board having a compressive strength in the range of 25 psi to 30 psi. Moreover, the foam should be fire resistant. It has been found that phenolic foam boards meet these requirements very well. Other closed cell foam materials, such as isocyanurate or urethane, are too resilient to absorb sufficient energy when contacted by aircraft landing gear, while others, such as polystyrene, are not fire resistant.

Figure 2:
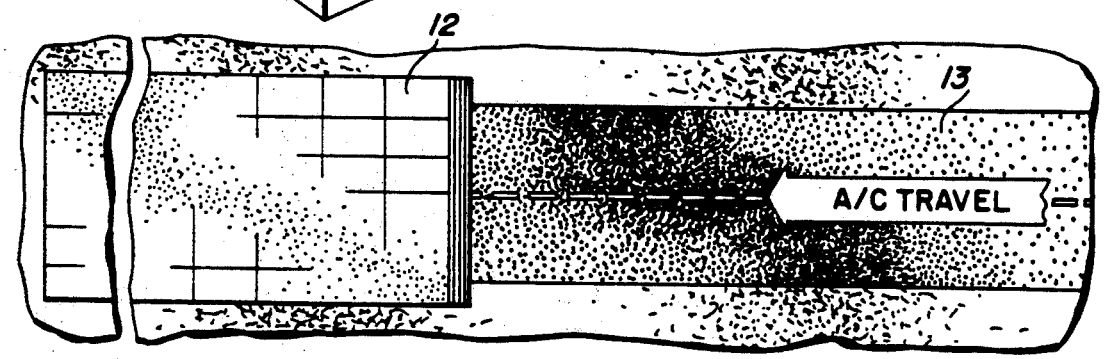
FIG. 2 is a simplified plan view of the end portion of an airplane runway and the arrestor area of the present invention.

In carrying out the invention, the boards are arranged in stacked relationship in an aircraft arrestor area. This location is illustrated in FIG. 2, wherein the arrestor area 12 is seen to be located at the end of the runway 13, with the direction of travel of the aircraft indicated by the arrow labeled A/C TRAVEL. While the size of the area may vary as conditions warrant, the arrestor area should be large enough to halt rapidly moving aircraft of the largest size expected to use the runway. Typically, the width may be as much as 150 feet and the length in the range of 200 to 400 feet. The depth of the foam bed may also vary with conditions, but would normally be in the range of 1½ to 2½ feet, preferably at about 2 feet.

Figure 3:
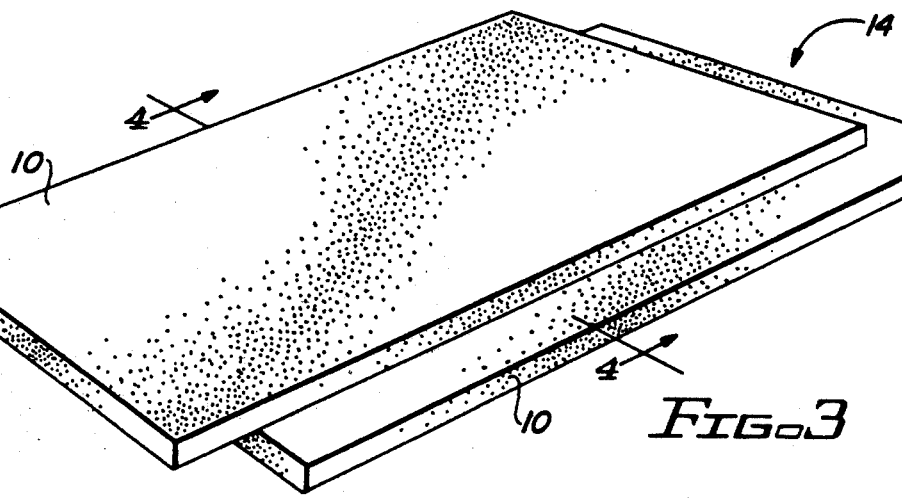
FIG. 3 is a pictorial representation of a typical panel formed from two of the boards of FIG. 1.
Figure 4:
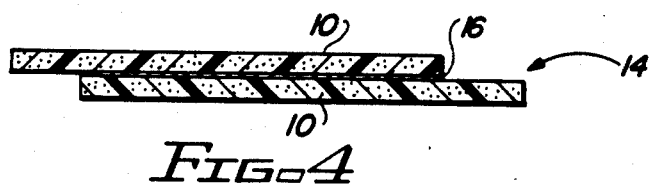
FIG. 4 is a transverse sectional view taken on line 4—4 of FIG. 3.

As shown in FIG. 3, the individual foam boards 10, which typically are of a size in the order of 4 by 4 feet or 4 by 8 feet, are adhered together in face-to-face relationship to form a panel 14 consisting of two board thicknesses. The boards are offset from each other so that the upper board overhangs the lower board in both the length and width directions. This is also illustrated in FIG. 4, which shows a layer of adhesive 16 securing the boards together to form a panel unit.

Referring to FIG. 5, the panels typically are adhered to the base surface 18 by a layer of adhesive 20 which can be the same type as is used to bond the boards 10 together. The base surface 18 may be a paved surface forming a continuation of the runway 13, as shown. If desired, a mechanical fastening system of any suitable type, not shown, may be employed to supplement the adhesive, especially if the bed is attached directly to the ground.

Still referring to FIG. 5, for the purpose of illustration the arrestor bed is shown as comprising five layers A, B, C, D, and E, with each layer being formed of individual panels 14 mechanically interlocked with adjacent panels by the shiplap type of joint resulting from the overhanging relationship of the individual boards of the panels. Each panel is adhered to the next overlying panel by an adhesive layer 22. Although not preferred, adhesive could also be used to adhere adjacent panels in the interlock region. The arrestor bed is built up adjacent the runway in step fashion, so that each layer is closer to the end of the runway than the next higher layer. This facilitates the entry of the aircraft into the foam bed and lessens the risk of losing control of the aircraft due to an initial hard impact with a thick bed of foam rising abruptly from the end of the runway. It also decreases the load on the landing gear at impact so that the gear does not break off. The distance from one step to the next may vary with the arrestor bed design, but will typically range from 3 to 8 feet.

It is necessary to use unfaced phenolic foam to form the arrestor bed because a faced product, when stacked in a multiple board arrangement, has too much compression resistance. Tests have shown that a stack of faced phenolic foam boards gives higher actual compression resistance than would be expected based on the compression resistance of each individual board. When a compression test ram penetrates a stack of faced boards, stress spikes occur at the interface with the board facers which are well beyond the generally uniform resistance which a more ideal stress/strain curve would predict. It was found that faced boards caused the stack to exceed the 100 psi test limit beyond which the wheels of an aircraft can ride up and onto the top facing of the bed rather than going through the foam. If this were to happen the aircraft would not meet the needed resistance to cause it to stop within the arrestor area. When the boards are unfaced, the stress/strain curve produced by compression tests on a stack of boards is nearly linear, and an aircraft can be relied on to move through the foam, crushing it and slowing down in the process. This is depicted in FIG. 6, which shows the landing gear G of an aircraft as it moves through a foam arrestor bed formed in accordance with the invention. The foam contacted by the gear has been crushed due to its friable nature and the individual boards and panels that form the bed have remained in place and have not been dislodged or hurled away by the impact. Much of the crushed foam will be pushed down and compressed by the wheels of the landing gear so that the wheels actually ride on a thin layer of the crushed compressed foam. If desired, this additional thickness may be compensated for by lowering the arresting bed layer with respect to the runway by an amount equivalent to the thickness of the crushed foam. It is not necessary that this be done, however, in view of the minimal thickness of the crushed foam layer.

Due to the friable nature of the foam and its low density, the impact caused by the landing gear of an aircraft and the resulting crushing of the foam causes chunks of foam to be thrown up into the air. Although it is unavoidable that some of the foam pieces will find their way into the air intake of the jet engines, no damage to the engine results, as the foam essentially disintegrates.

In order to produce unfaced foam boards in a process that normally employs facing sheets, it is necessary to modify the manufacturing process. Referring to FIG. 7, the process is schematically illustrated as having a lower conveyor 30 and a lower guide roll 32 about which a web of facing material 34 is drawn from supply roll 36. An upper conveyor 38 is spaced from the lower conveyor and an upper guide roll 40 is provided about which a web of facing material 42 is drawn into contact with the upper conveyor from supply roll 44. Streams of liquid or semi-liquid foaming chemicals are dispensed onto the lower facing web 34 at the upstream end of the line from a series of transversely spaced nozzles 46. As the foaming ingredients move downstream, they pass through a gas-fired oven 48 which facilitates the foaming process. The ultimate thickness of the foam is determined by the spacing between the upper and lower conveyors.

Normally, the facing material, which prevents the foaming ingredients and the resulting foam from sticking to or fouling the apparatus, remains on the final board product. For use in the present invention, however, the facing webs are stripped from the foam board as it emerges from the conveyors. Thus, the web 42 is wound onto roll 50 and the web 34 is wound onto the roll 52. The facing material is not limited to any particular material, so long as it has sufficiently low adhesion to the foam to allow it to be readily stripped. Various films which have been treated with a nonstick substance, such as petroleum oil, may be used. Untreated Mylar film and aluminum foil which has been treated with silicone spray are other examples of suitable facer materials that can readily be stripped from the foam.

After the facer webs have been stripped, the foam is already hard and substantially cured. At this point it is then severed to length by cross-cut saw 54, and the resulting board 10 is moved away from the cutting station by take-off conveyor 56, ready to be cut to final size. The board is subsequently laminated to one or more other boards to produce the finished panel by any suitable means, which may involve a hand lay-up operation or automatic or semi-automatic operations. Whichever laminating process is employed, the boards will preferably be glued to each other and held under pressure until set.

Although any suitable adhesive may be used to bond the foam boards to each other and to the base support surface, the preferred adhesive is a latex adhesive which is capable of bonding the foam to either asphalt or concrete paving as well as to other foam boards. Latex adhesive is easy to use in the plant as opposed to a two-part adhesive system, is not objectionable from a health or environmental view, and is quick to dry.

The panels employed need not be restricted to those formed from only two laminated boards of the type illustrated in FIGS. 3 and 4. A three-ply panel is shown in FIGS. 8 and 9, wherein the foam boards 10 are arranged so that the middle board is offset in two dimensions from the outer boards. This produces a mechanical interlock similar to a tongue and groove arrangement and can be used if it is desired to have greater mechanical holding power along the panel edges. It will be appreciated that panels comprised of more than three layers can also be employed, with an edge configuration, such as alternating overhanging boards, designed to provide a suitable mechanical interlock.

It should now be appreciated that the present invention provides a simple, economical and reliable method of bringing aircraft to a halt in a safety overrun area. The panels forming the arrestor bed are readily produced and installed. Since the bed is formed of individual panels, the damaged area of a bed resulting from an aircraft entering the overrun area can readily be cut out and replaced within a short period of time.

The process permits the boards to be produced on foam board producing equipment which is already in place, needing to be modified only by installing facing stripping means downstream from the compression conveyors.

It should now be apparent that the invention is not necessarily limited to all the specific details described in connection with the preferred embodiments, but that changes to certain features of the preferred embodiments which do not alter the overall basic function and concept of the invention may be made without departing from the spirit and scope of the invention, as defined in the appended claims.

What is claimed is:

1. An aircraft arresting system, comprising:
   an aircraft arresting area adjacent an end of an aircraft runway;
   the aircraft arresting area being comprised of a plurality of vertically stacked layers of preformed rigid, friable, fire resistant foam; thereby permitting the height of the arresting area to be varied by removing or adding any number of the vertically stacked layers of foam;
   the layers of foam being adhered to each other by adhesive, with the lowermost layer of foam being adhered to a support surface;
   the compressive resistance of the combined layers of rigid foam being less than the force exerted by the landing gear of an aircraft of the type to be arrested when moving into the arresting area from the runway, and the layers of rigid foam being comprised of a plurality of unfaced rigid foam boards so that the foam is crushed when contacted by the landing gear.

2. The aircraft arresting system of claim 1, wherein each layer is comprised of a plurality of panels formed from the unfaced rigid foam boards, the edges of adjacent panels being mechanically connected.

3. The aircraft arresting system of claim 2, wherein each panel is comprised of a plurality of boards adhered in face-to-face relationship, each board having a thickness in the range of 1 inch to 6 inches and a compressive strength in the range of 20 psi to 80 psi, the boards being staggered with respect to the adjacent board of the panel to provide a mechanical interlock between adjacent panels in a layer.

4. The aircraft arresting system of claim 3, wherein each board has a thickness in the range of 2 inches to 4 inches and a compressive strength in the range of 25 psi to 30 psi.

5. The aircraft arresting system of claim 1, wherein the rigid foam comprises a closed cell foam having a density in the range of 2 pcf to 4 pcf and a compressive strength in the range of 20 psi to 80 psi.

6. The aircraft arresting system of claim 1, wherein the rigid foam comprises phenolic foam.

7. The aircraft arresting system of claim 1, wherein the arresting area has a width at least as wide as the runway and a length of at least 200 feet.

8. The aircraft arresting system of claim 2, wherein each layer of panels adjacent the runway is closer to the runway than the next higher layer of panels, whereby the edge of the aircraft arresting area adjacent the runway is arranged in step-like fashion.

9. A method of assisting to arrest an aircraft moving over an end of an aircraft runway, comprising the steps of:

adhering a plurality of vertically stacked layers of preformed rigid, friable fire resistant foam to each other and to a base support adjacent the end of the runway to form an aircraft arresting area thereby permitting the height of the arresting area to be varied by removing or adding any number of the vertically stacked layers of foam;

the compressive strength of the combined layers of rigid foam being less than the force exerted by the landing gear of an aircraft of the type to be arrested when moving into the arresting area from the runway, the layers of rigid foam being comprised of a plurality of unfaced rigid foam boards so that the foam is crushed when contacted by the landing gear and the boards in one layer being adhered to the boards in adjacent layers by adhesive.

10. The method of claim 9, wherein each layer is comprised of a plurality of panels formed from the unfaced rigid foam boards, the method including the further step of mechanically connecting the edges of adjacent panels.

11. The method of claim 10, wherein each panel is formed by adhering a plurality of boards together in face-to-face relationship, each board having a thickness in the range of 1 inch to 6 inches, and staggering each board with respect to the adjacent board in the panel to provide a mechanical interlock between adjacent panels in a layer.

12. The method of claim 9, wherein the rigid foam boards are produced by depositing liquid or semi-liquid chemicals onto a lower moving web of facing material, permitting the foam to rise so as to contact an upper moving web of facing material at a predetermined height, and stripping the webs of facing material from the foam after the foam has become self sustaining.

13. The method of claim 12, wherein the rigid foam comprises phenolic foam.

* * * * *